US008151009B2

(12) United States Patent
Goldstein et al.

(10) Patent No.: US 8,151,009 B2

(45) Date of Patent: Apr. 3, 2012

(54) SERIAL CONNECTION EXTERNAL INTERFACE FROM PRINTED CIRCUIT BOARD TRANSLATION TO PARALLEL MEMORY PROTOCOL

(75) Inventors: Martin Goldstein, Cupertino, CA (US); Hau Jiun Chen, Singapore (SG); Lidia Warnes, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 901 days.

(21) Appl. No.: 11/789,545

(22) Filed: Apr. 25, 2007

(65) Prior Publication Data

US 2008/0266993 A1 Oct. 30, 2008

(51) Int. Cl.

| | |
|---|---|
| ***G06F 3/00*** | (2006.01) |
| ***G06F 13/12*** | (2006.01) |
| ***G06F 13/38*** | (2006.01) |
| ***G06F 13/20*** | (2006.01) |
| ***G06F 13/36*** | (2006.01) |
| ***H05K 7/10*** | (2006.01) |

(52) U.S. Cl. .............. 710/11; 710/15; 710/74; 710/301; 710/313; 710/315

(58) Field of Classification Search .................... 710/15, 710/11, 74, 301, 313, 315

See application file for complete search history.

(56) References Cited

U.S. PATENT DOCUMENTS 5,396,102 A 3/1995 Toshio et al.
5,440,755 A * 8/1995 Harwer et al. ................ 710/315
5,901,070 A 5/1999 Trainor
5,923,531 A * 7/1999 Bachman et al. ............. 361/690
5,935,252 A 8/1999 Berglund et al.
6,215,727 B1 4/2001 Parson et al.
6,261,104 B1 * 7/2001 Leman ............................ 439/61
6,347,367 B1 2/2002 Dell et al.
6,363,450 B1 3/2002 Lash et al.
6,392,946 B1 5/2002 Wu et al.
6,467,048 B1 10/2002 Olarig et al.
6,507,888 B2 1/2003 Wu et al.
6,779,075 B2 8/2004 Wu et al.
6,826,113 B2 11/2004 Ellis et al.
7,143,298 B2 11/2006 Wells et al.
7,280,373 B2 10/2007 Aizawa
7,292,950 B1 * 11/2007 Resnick .......................... 702/85
7,379,316 B2 5/2008 Rajan
7,475,316 B2 1/2009 Cowell et al.
7,532,537 B2 5/2009 Solomon et al.
7,539,810 B2 5/2009 Gower et al.
7,577,039 B2 8/2009 Yang et al.
2002/0141170 A1 * 10/2002 Rhoads ......................... 361/796
2004/0163002 A1 8/2004 Doblar et al.
2006/0047899 A1 3/2006 Ilda et al.
2006/0146629 A1 7/2006 Lee
2006/0155517 A1 7/2006 Dobbs et al.
2006/0236134 A1 10/2006 Kamepalli et al.

(Continued)

OTHER PUBLICATIONS

"How FB-DIMM Memories Work", Gabriel Torres, Dec. 23, 2005, http://www.hardwaresecrets.com/article/266.*

(Continued)

*Primary Examiner* — Chun-Kuan Lee
*Assistant Examiner* — Farley Abad

(57) ABSTRACT

A translator of an apparatus in an example through a serial connection external interface of a printed circuit board (PCB) communicates between a serial memory protocol within the PCB and a parallel memory protocol outside the PCB.

14 Claims, 8 Drawing Sheets

U.S. PATENT DOCUMENTS

| | | | | |
|---|---|---|---|---|
| 2007/0192563 | A1 | 8/2007 | Rajan et al. | |
| 2007/0239906 | A1 * | 10/2007 | Vakil et al. | 710/52 |
| 2008/0052462 | A1 * | 2/2008 | Blakely et al. | 711/115 |
| 2008/0059816 | A1 | 3/2008 | Paniagua et al. | |
| 2008/0077731 | A1 | 3/2008 | Forrest et al. | |
| 2008/0091888 | A1 * | 4/2008 | Sandy | 711/154 |
| 2008/0104456 | A1 * | 5/2008 | Talbot | 714/704 |
| 2008/0126690 | A1 | 5/2008 | Rajan et al. | |
| 2008/0181021 | A1 | 7/2008 | Thayer | |
| 2008/0250292 | A1 | 10/2008 | Djordjevic | |
| 2008/0256281 | A1 | 10/2008 | Fahr et al. | |
| 2009/0020608 | A1 | 1/2009 | Bennett et al. | |
| 2009/0101711 | A1 | 4/2009 | Grayson | |

OTHER PUBLICATIONS

"Riser card Definition" Dec. 10, 2005, http://web.archive.org/web/20051210214116/http://www.pcmag.com/encyclopedia_term/0,2542,t=riser+card&i=50553,00.asp.*

DIMM—Wikipedia, the free encyclopedia, http://web.archive.org/web/20051221101920/http://en.wikipedia.org/wiki/DIMM.*

Torres, Gabriel "How FB-DIMM Memories Work", http://www.hardwaresecrets.com/article/266, published Dec. 23, 2005.

*JEDEC Standatd, FBDIMM: Architecture and Protocol*, JESD206. PDF © JEDEC Solid State Technology Association 2007, Arlington, Virginia http://www.jedec.org/download/search/JESD206.pdf Section 2.1.3 (AMB addressing) table 2-4 showing the DS [3:0] usage, Jan. 2007.

Same Document Section 2.1.3 paragraph 3 shows that for DRAM addressing one can only use DS [2:0] , Jan. 2007.

Same Document Section 4.2.3 find the FBD command encoding protocol. This is the same protocol that would be used by disclosure 63, this table also shows the RS (rank selection bit), Jan. 2007.

Same Document Section 4.2.4 find information on DRAM commands and a DRAM comman mapping example—this section (paragraph 3) explains the use of the RS bit according to the FBD spec, Jan. 2007.

Same Document Section 4.4.2 gives a write timing example and describes the use of write FIFOs by the AMB, Jan. 2007.

Same Document Section 4.4.2.1 describes the use of the WS bits according to the FBD protocol, Jan. 2007.

* cited by examiner

SERIAL CONNECTION EXTERNAL INTERFACE FROM PRINTED CIRCUIT BOARD TRANSLATION TO PARALLEL MEMORY PROTOCOL

BACKGROUND

DIMM (dual in-line memory module) technology has random access memory (RAM) integrated circuits (ICs) mounted on a printed circuit board (PCB). Various types of DIMMs exist. DDR SDRAM (Double Data Rate Synchronous Dynamic Random Access Memory) DIMM technology has a parallel external interface. Fully buffered DIMM or FB-DIMM technology has a serial external interface.

FB-DIMM technology employs an Advanced Memory Buffer (AMB) having a serial connection to a memory controller, and a parallel connection to dynamic random access memory (DRAM). The AMB on each FB-DIMM translates the communication in serial point-to-point link protocol received from the memory host controller to DDR3 SDRAM parallel protocol transmitted to the DRAMs as read, write, refresh, etc. operations within the DIMM.

DESCRIPTION OF THE DRAWINGS

Features of exemplary implementations of the invention will become apparent from the description, the claims, and the accompanying drawings in which:

DETAILED DESCRIPTION

Figure 1:
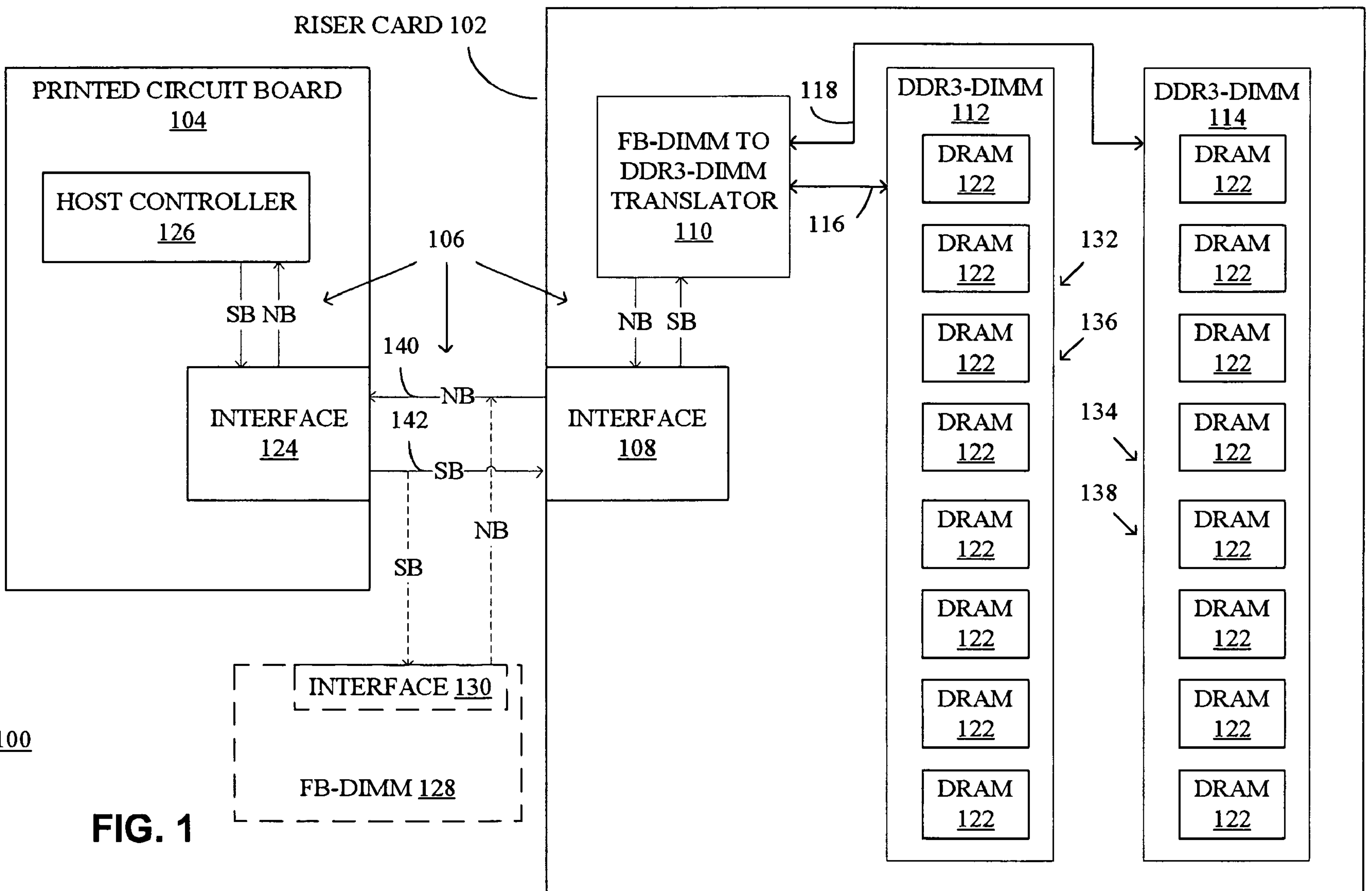
FIG. 1 is a representation of an implementation of an apparatus that comprises one or more riser boards and/or cards, a system board and/or printed circuit board (PCB), one or more serial protocol busses, one or more parallel protocol memory modules, and one or more parallel protocol busses.

Referring to the BACKGROUND section above, while the FB-DIMM has internal memory with parallel connections, the external interface is a serial connection. With DDR3 SDRAM being a successor to DDR2 SDRAM in DDR memory standards, computer system boards with FB-DIMM connectors embedded will not be able to support DDR3 SDRAM DIMMs. The serial memory connections of FB-DIMM connectors are fundamentally different from the parallel memory connections of DDR3 DRAM DIMM connectors.

FB-DIMMs are based on serial data transfer technology while DDR3 SDRAM DIMMs are based on parallel data transfer technology. An exemplary implementation is allows both different memory technologies to be used in a same package with no additional cost added to the design of a computer system board with existing FB-DIMM connectors. The cost of supporting both memory technologies on a single platform in an example is moved to a translator riser board and/or card. An exemplary translator riser card comprises an FB-DIMM-to-DDR3 SDRAM translator IC and DDR3 SDRAM DIMM connectors. Full memory speed for both FB-DIMMs and DDR3 SDRAM DIMMs in an example is achievable.

An exemplary implementation supports DDR3 SDRAM DIMMs on systems with embedded FB-DIMM connectors without need for additional hardware to be designed into the system board. An exemplary approach reduces modification time, labor, and/or materials through employment of a single memory technology such as FB-DIMM on the computer system board while at the same time increasing memory capacity of both FB-DIMM and DDR3 SDRAM. A translator in an example serves to communicatively interconnect FB-DIMM and DDR3 SDRAM. An exemplary translator comprises a translator riser board and/or card. The riser card in an example comprises a circuit board and/or card that connects directly to the PCB and allows addition of cards to the PCB by connection through the riser card.

An exemplary implementation provides low cost for DDR3 SDRAM support on FB-DIMM connectors through employment of a translator riser card. An exemplary approach provides low cost employment of two different types of memory technology, for example, DDR3 SDRAM DIMMs and FB-DIMMs on a single platform with existing FB-DIMM connector, for example, through employment of a translator riser card. An exemplary translator riser card comprises an FB-DIMM-to-DDR3 SDRAM translator and DDR3 DIMM connectors. For example, the translator comprises an IC and/or chip. The translator riser card in an example plugs in vertically and/or orthogonally to FB-DIMM connectors and allows DDR3 DIMMs to run directly from the FB-DIMM connectors. An exemplary implementation reduces modification cost by allowing a single memory technology, for example, FB-DIMM, on the computer system board and/or PCB and contemporaneously promoting memory capacity of DDR3 SDRAM FB-DIMM, for example, through employment of the translator riser card.

An exemplary riser card plugs directly into a system board with an FB-DIMM connector and allows DDR3 DIMMs on computer systems designed for FB-DIMM memory technology. With a translator riser card in an example no additional investment is required to allow DDR3 memory technology on system boards designed for FB-DIMM memory technology.

In an exemplary implementation, a total number of DDR DIMM connectors on the riser card outside the PCB can be the same as a total number of FBDIMM connectors on the PCB. An exemplary approach allows a user to choose between serial and parallel memory technologies without loss in a total quantity of DDR DIMM modules and FBDIMM modules allowable in the system regardless of the memory technology the user and/or customer chooses to use.

Turning to FIG. 1, an implementation of an apparatus 100 in an example comprises one or more riser boards and/or cards 102, a system board and/or printed circuit board (PCB) 104, one or more serial protocol busses 106, one or more and/or a plurality of parallel protocol memory modules 112, 114, and one or more parallel protocol busses 116, 118. The serial protocol bus 106 in an example comprises a high speed serial bus. Exemplary implementations of the serial protocol bus 106 comprise industry standard high speed serial busses such as FBD (fully buffered DIMM; FB-DIMM), PCI-express (PCIe), and HTx (hyper-transport) busses.

Figure 3:
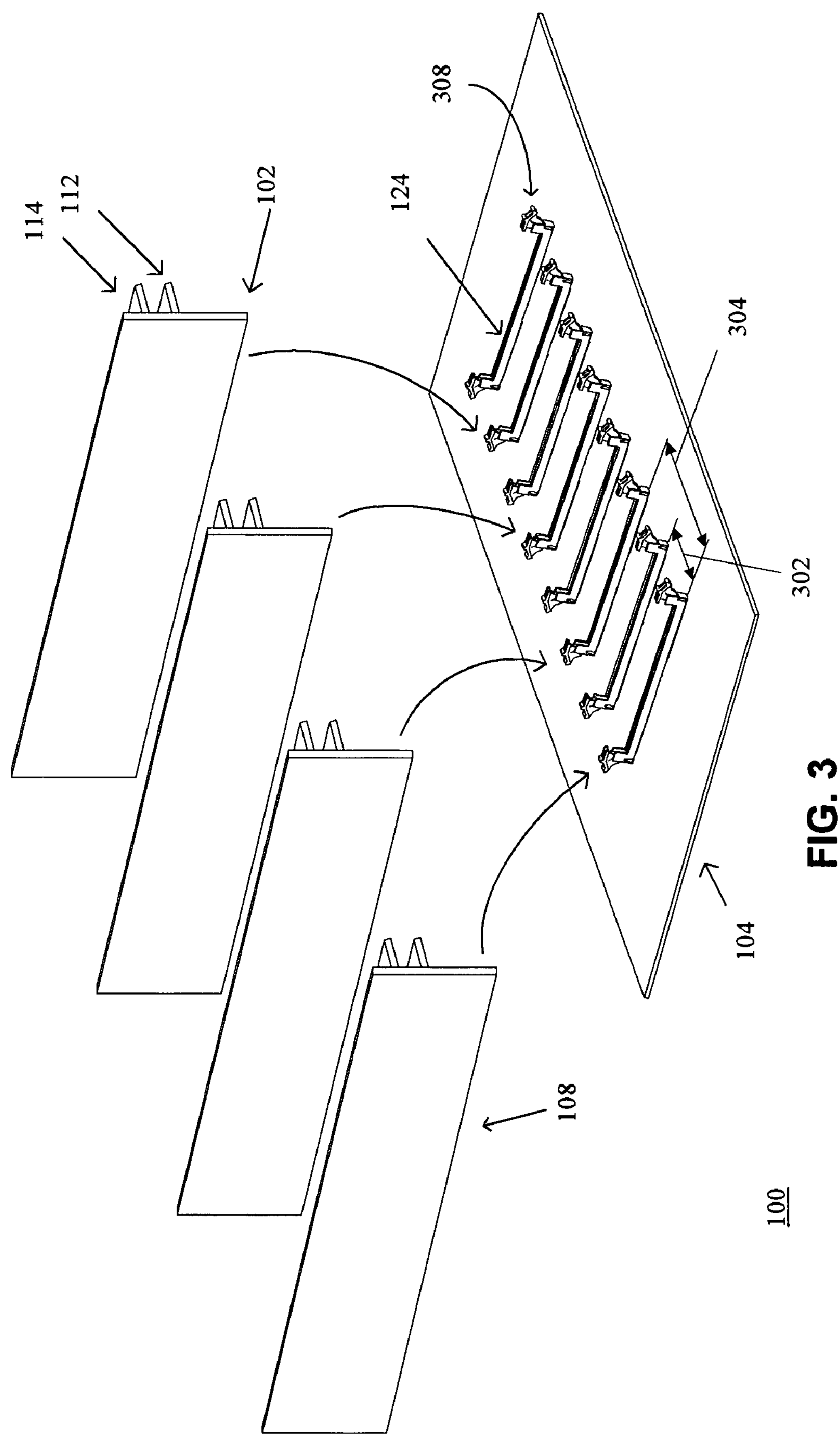
FIG. 3 is a perspective, cutaway, partial, exploded representation of a plurality of riser cards, a plurality of parallel protocol memory modules, and the PCB of an implementation of the apparatus of FIG. 1, and illustrates an exemplary vertical and/or orthogonal arrangement of the parallel protocol memory modules, and further illustrates a first exemplary locatability of the riser cards on serial protocol interfaces of the PCB.
Figure 4:
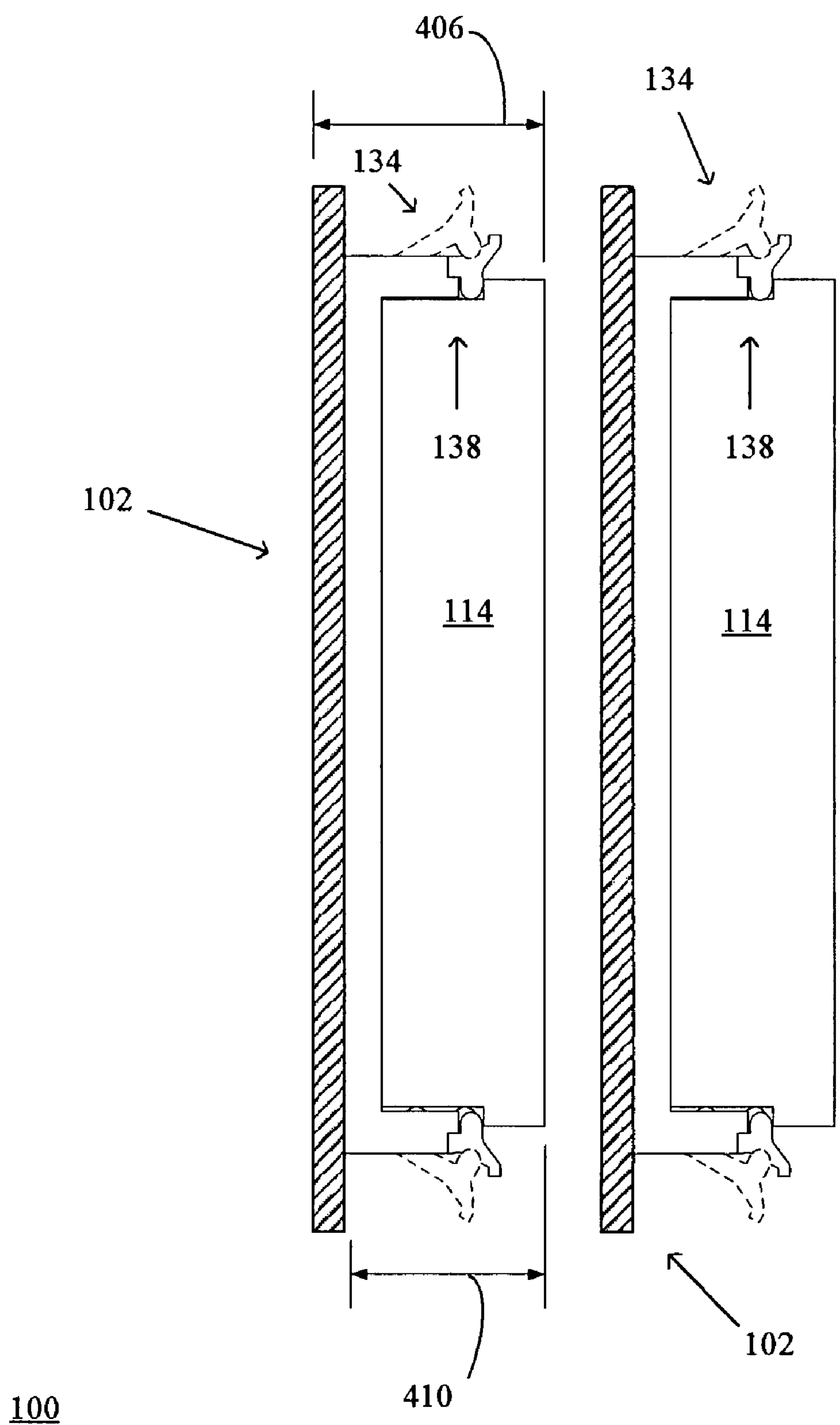
FIG. 4 is a top, partial representation of two riser cards and two parallel protocol memory modules of the implementation of the apparatus of FIG. 3.
Figure 5:
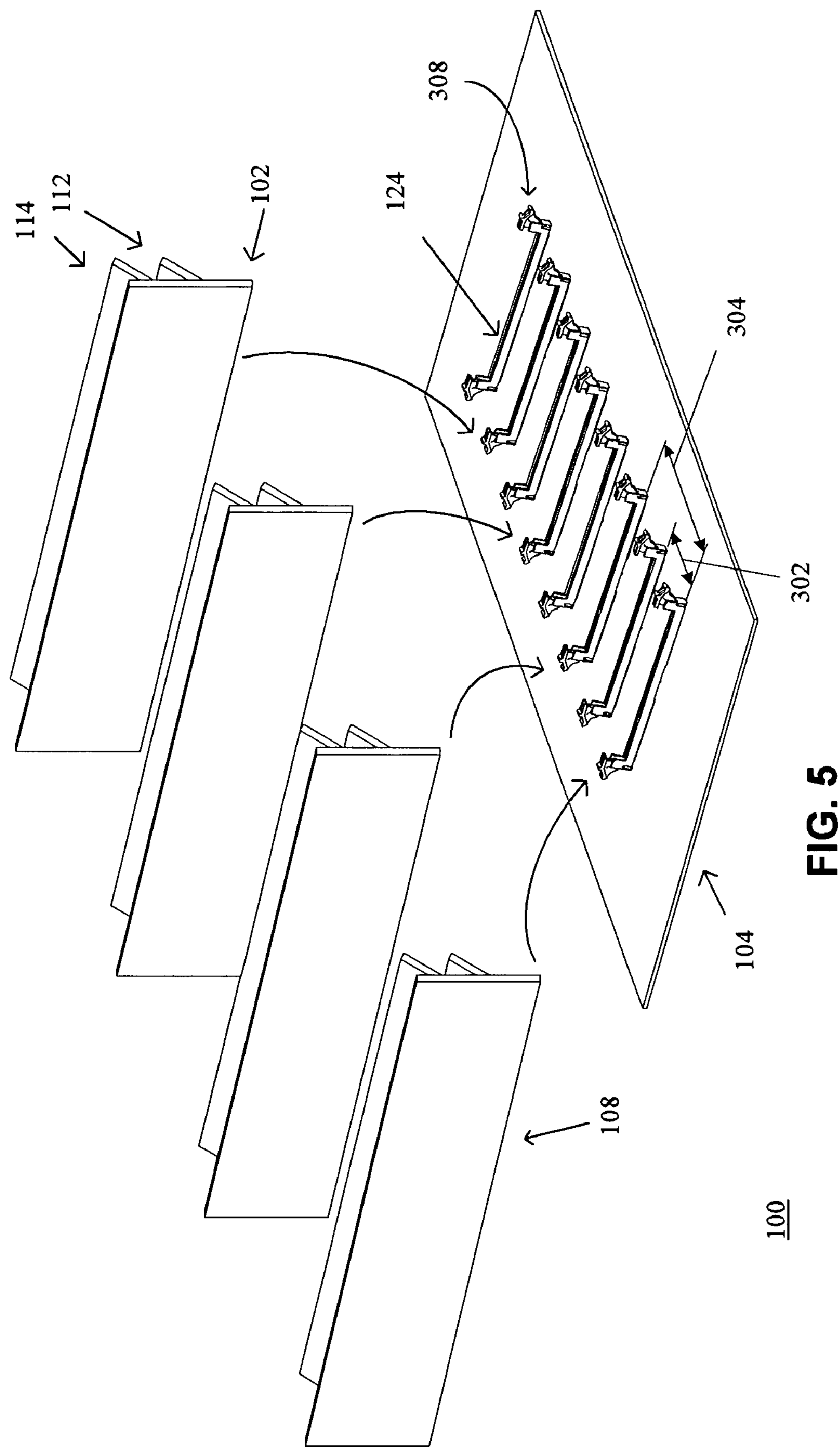
FIG. 5 is a perspective, cutaway, partial, exploded representation of a plurality of riser cards, a plurality of parallel protocol memory modules, and the PCB of an implementation of the apparatus of FIG. 1, and illustrates an exemplary angled and/or oblique arrangement of the parallel protocol memory modules.

The riser card 102 in an example comprises a serial protocol interface 108, a translator 110, and one or more parallel protocol connectors and/or interfaces 132, 134 (FIGS. 1 and 4). As discussed herein with reference to FIG. 2, the riser card 102 in an example optionally comprises a connector 202 and/or one or more voltage regulator modules 204. The parallel protocol memory modules 112, 114 in an example comprise respective parallel protocol connectors and/or interfaces 136, 138 (FIGS. 1 and 4) and a plurality of parallel memory devices 122. Exemplary numbers of instances of the parallel protocol memory modules 112, 114 on an exemplary riser card 102 comprise any selected and/or desirable number, for example, two, four, eight, or sixteen parallel protocol memory modules 112, 114. For explanatory purposes, FIGS. 1-7 illustrate an exemplary implementation that comprises two parallel protocol memory modules 112, 114 on each riser card 102. As will be appreciated by those skilled in the art, an exemplary riser card 102 comprises more than two parallel protocol memory modules 112, 114. Exemplary parallel protocol memory modules 112, 114 comprise registered and/or unbuffered DIMMs, for example DDR3 DIMMs. An exemplary parallel memory device 122 comprises a dynamic random access memory (DRAM). The riser card 102 and the parallel protocol memory modules 112, 114 in an example serve to take a place of, substitute for, and/or provide an upgrade from a serial protocol memory module 128 that comprises interface 130 such as a fully buffered dual in-line memory module (FB-DIMM, FBDIMM, and/or FBD).

The PCB 104 in an example comprises a serial protocol interface 124 and a memory controller and/or host controller 126. The serial protocol interfaces 108, 124, 130 in an example comprise FB-DIMM memory module connectors (FB-DIMM connectors). An exemplary FB-DIMM memory module connector as the serial protocol interface 108, 130 in an example comprises two hundred forty (240) pins and/or fingers that comply with standards of the JEDEC Solid State Technology Association (previously known as the Joint Electron Device Engineering Council; World Wide Web jedec.org).

The pins of an exemplary interface 108 are vertical and/or orthogonal. The pins of another exemplary interface 108 are angled and/or oblique. The serial protocol interface 108 in an example comprises gold pins that fit directly into an FB-DIMM memory module connector and/or FB-DIMM connector as the parallel protocol interface 124. An exemplary the FB-DIMM memory module connector as the serial protocol interface 124 comprises slots and/or holes that receive, engage, mesh, couple, connect, and/or mate with pins as an exemplary interface 108. The riser card 102 in an example fits directly into the FB-DIMM connector as the serial protocol interface 124. An edge of the riser card 102 in an example comprises gold fingers and/or pins that allow the riser card 102 to plug directly into the FB-DIMM memory module connector as the serial protocol interface 124. As discussed herein with reference to FIG. 2, the riser card 102 in an example comprises notches 206, 208 at both ends to allow the riser card 102 to be accommodated by end latches 308 (FIG. 3), for example, of a standard FB-DIMM memory module connector as an exemplary interface 124.

The bus 106 as an FB-DIMM bus in an example comprises a northbound (NB) path 140 and a southbound (SB) path 142. An exemplary northbound path 140 comprises fourteen (14) bit lanes carrying data from memory such as the parallel protocol memory module 112, 114 to a processor such as the host controller 126. An exemplary southbound path 142 comprises ten (10) southbound (SB) bit lanes carrying commands and data from the processor such as the host controller 126 to memory such as the parallel protocol memory module 112, 114. An exemplary parallel protocol bus 116, 118 comprises a Double Data Rate (DDR) bus, for example, a DDR3 bus.

To allow employment of one or more DDR3 DIMMs as one or more parallel protocol memory modules 112, 114 on a computer system and/or PCB 104 with an existing FB-DIMM connector as the serial protocol interface 124 in an example a user need only plug in riser card 102 into the FB-DIMM connector as the serial protocol interface 124 and install DDR3 SDRAM (Synchronous Dynamic Random Access Memory) DIMMs as the parallel protocol memory modules 112, 114 at parallel protocol interface 132, 134 on the riser card 102. For example, to allow employment of one or more DDR3 DIMMs as one or more parallel protocol memory modules 112, 114 in an example a user need only replace an FB-DIMM as the serial protocol memory module 128 with the riser card 102, and have the DDR3 SDRAM DIMMs as the parallel protocol memory modules 112, 114 coupled with the riser card 102. To allow employment of an FB-DIMM as the serial protocol memory module 128 in an example a user need only replace the riser card 102 with the FB-DIMM as the serial protocol memory module 128.

The FB-DIMM to DDR3 translator IC as the translator 110 in an example receives commands and read data from the host controller 126 and sends write data back to the host controller 126 using the FB-DIMM protocol as a serial memory protocol. The FB-DIMM to DDR3 translator IC as the translator 110 in an example translates the FB-DIMM protocol as the serial memory protocol to DDR protocol as a parallel memory protocol to send transfer commands and read/write data to the DDR3 DIMMs as the parallel protocol memory modules 112, 114. The translator 110 in an example drives one or more DDR busses as the busses 116, 118.

Figure 2:
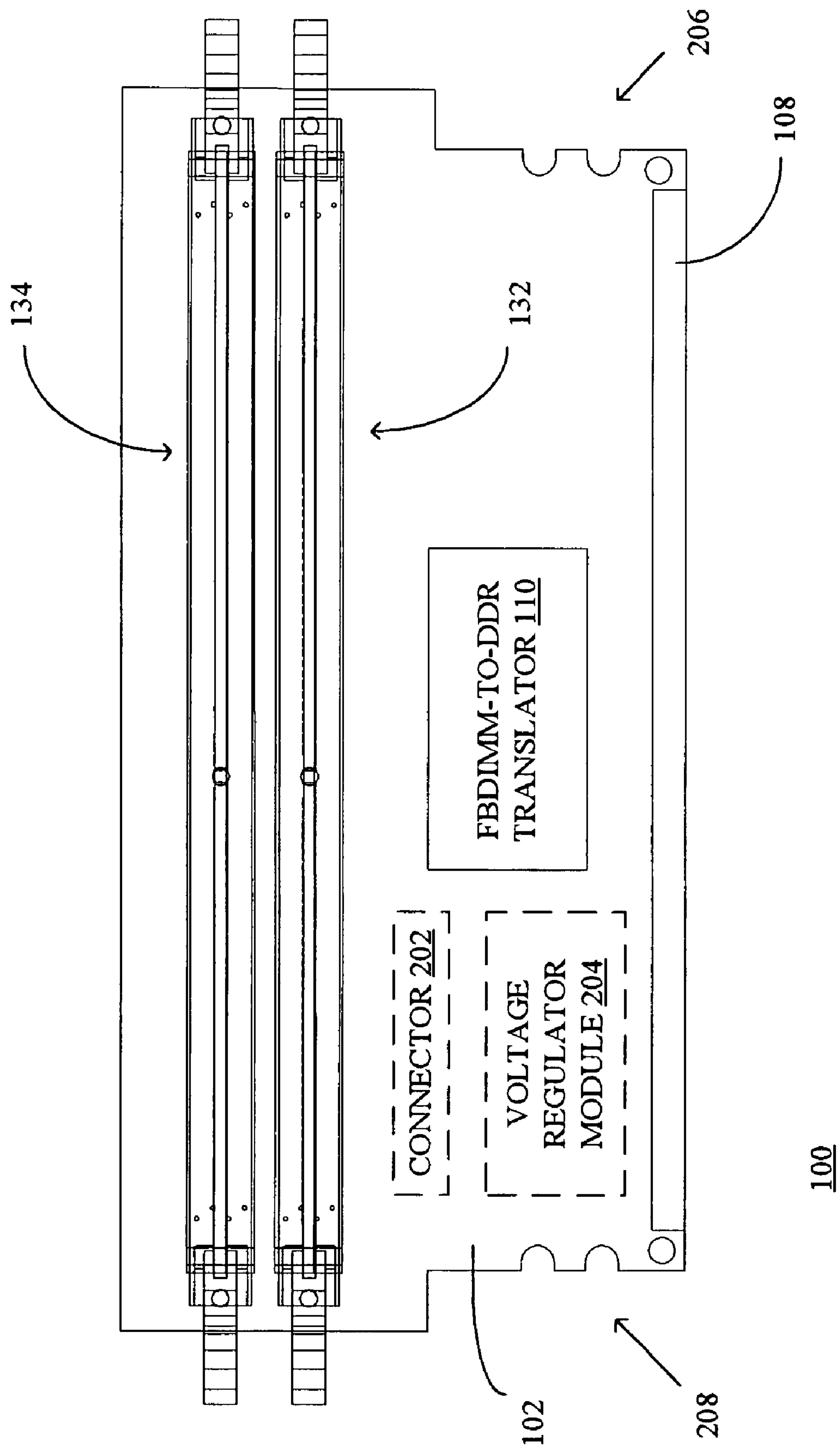
FIG. 2 is an enlarged, side representation of a riser card of an implementation of the apparatus of FIG. 1.

Turning to FIG. 2, the riser card 102 in an example comprises notches 206, 208 at both ends to allow the riser card 102 to be accommodated by end latches (not shown) of a standard FB-DIMM memory module connector as an exemplary interface 124. The riser card 102 in an example optionally comprises a connector 202 and/or one or more voltage regulator modules 204. The connector 202 in an example receives and/or couples with a flying lead cable (not shown) to deliver additional power to the riser card 102, for example, to the voltage regulator module 204. An exemplary connector 202 is locatable at any desirable, selected, and/or convenient place on the riser card 102. The voltage regulator module 204 in an example is locatable on the card 102 such as to provide additional, extra, and/or sufficient power to the components onboard and/or connected with the riser card 102. An exemplary voltage regulator module 204 serves to generate component and/or bus voltages.

Turning to FIG. 3, the serial protocol interfaces 108 of a plurality of riser cards 102 in an example are inserted directly into a respective plurality of FB-DIMM connectors as the serial protocol interfaces 124 on the PCB 104. Referring to FIGS. 1, 3, and 4, DDR3 SDRAM memory as parallel protocol memory modules 112, 114 in an example have respective interfaces 136, 138 inserted on respective DDR3 DIMM connectors as the parallel protocol interfaces 132, 134 of the riser card 102. The PCB 102 in an example is embedded with FB-DIMM memory technology as a serial memory protocol implementation such as through employment of the host controller 126 and the serial protocol interface 124. An exemplary connector-to-connector distance 302 between adjacent and/or successive interfaces 124 comprises approximately 0.5 in (12.7 mm) to 0.8 in (20.3 mm) or more.

Figure 7:
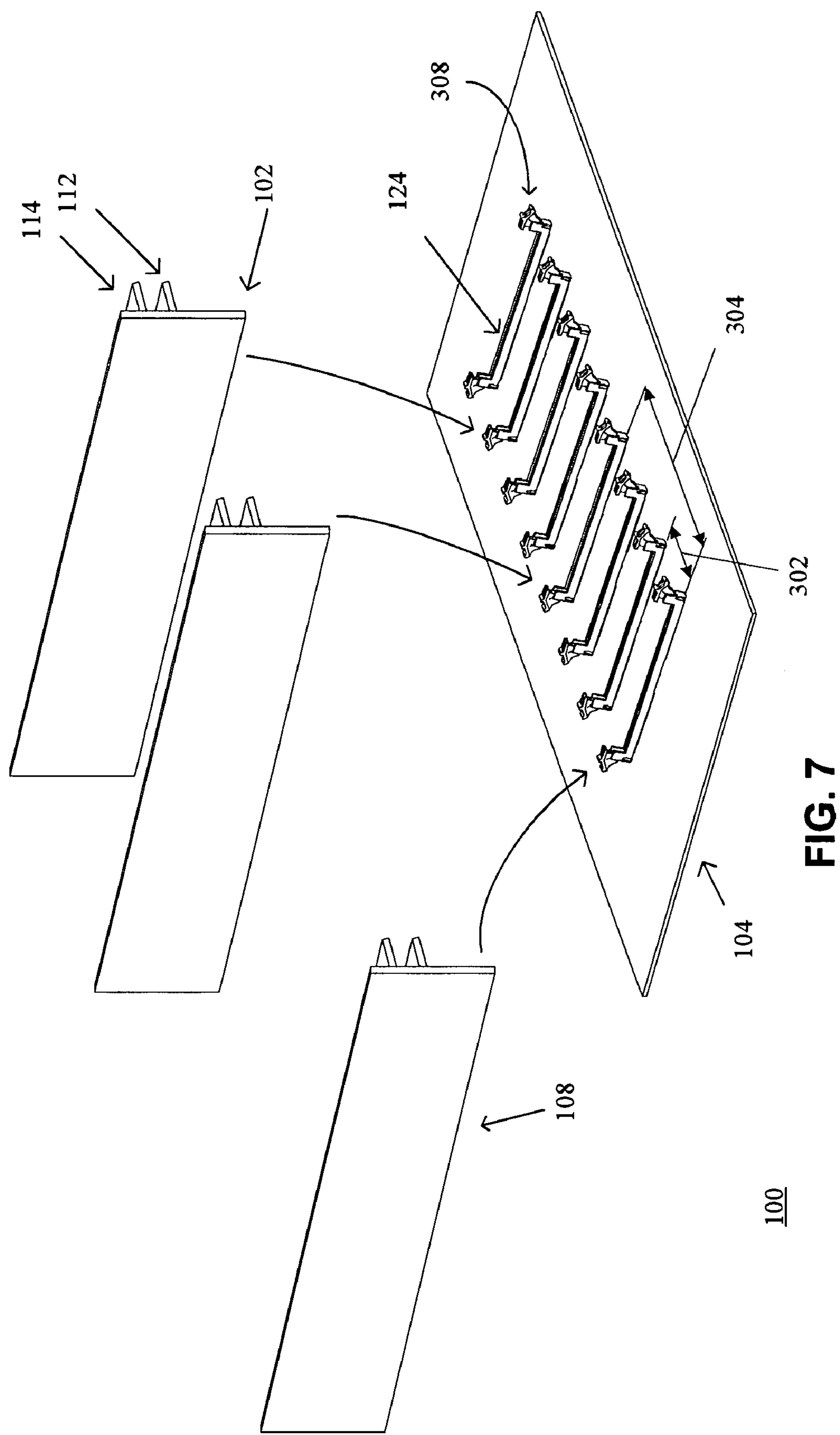
FIG. 7 is similar to FIG. 3, and illustrates a second exemplary locatability of the riser cards on serial protocol interfaces of the PCB.

The serial protocol interfaces 108 in an example are locatable in staggered, successive, and/or spaced interfaces 124. An exemplary distance 304 between staggered serial protocol interfaces 124 comprises approximately 1.0 (25.4 mm) to 1.6 in (40.6 mm) or more. For explanatory purposes, FIG. 3 illustrates an exemplary implementation that comprises a serial protocol interface 108 locatable in alternate, every other, and/or every second serial protocol interface 124. For explanatory purposes, FIG. 7 illustrates another exemplary implementation that comprises a serial protocol interface 108 locatable in every third serial protocol interface 124, for example, skipping two serial protocol interfaces 124 between each connection of a serial protocol interface 108 to a corresponding serial protocol interface 124.

Referring to FIG. 4, an exemplary interface 132 comprises a latch that pivots into a holding gap as an exemplary interface 136. An exemplary latch as the interface 132 comprises a standard DIMM connector and/or socket latch. An exemplary depth 406 of the riser card 102 comprises approximately 1.4 in (35.56 mm). An exemplary depth 410 of the parallel protocol memory module 112, 114 comprises approximately 1.2 in (30.48 mm).

Figure 6:
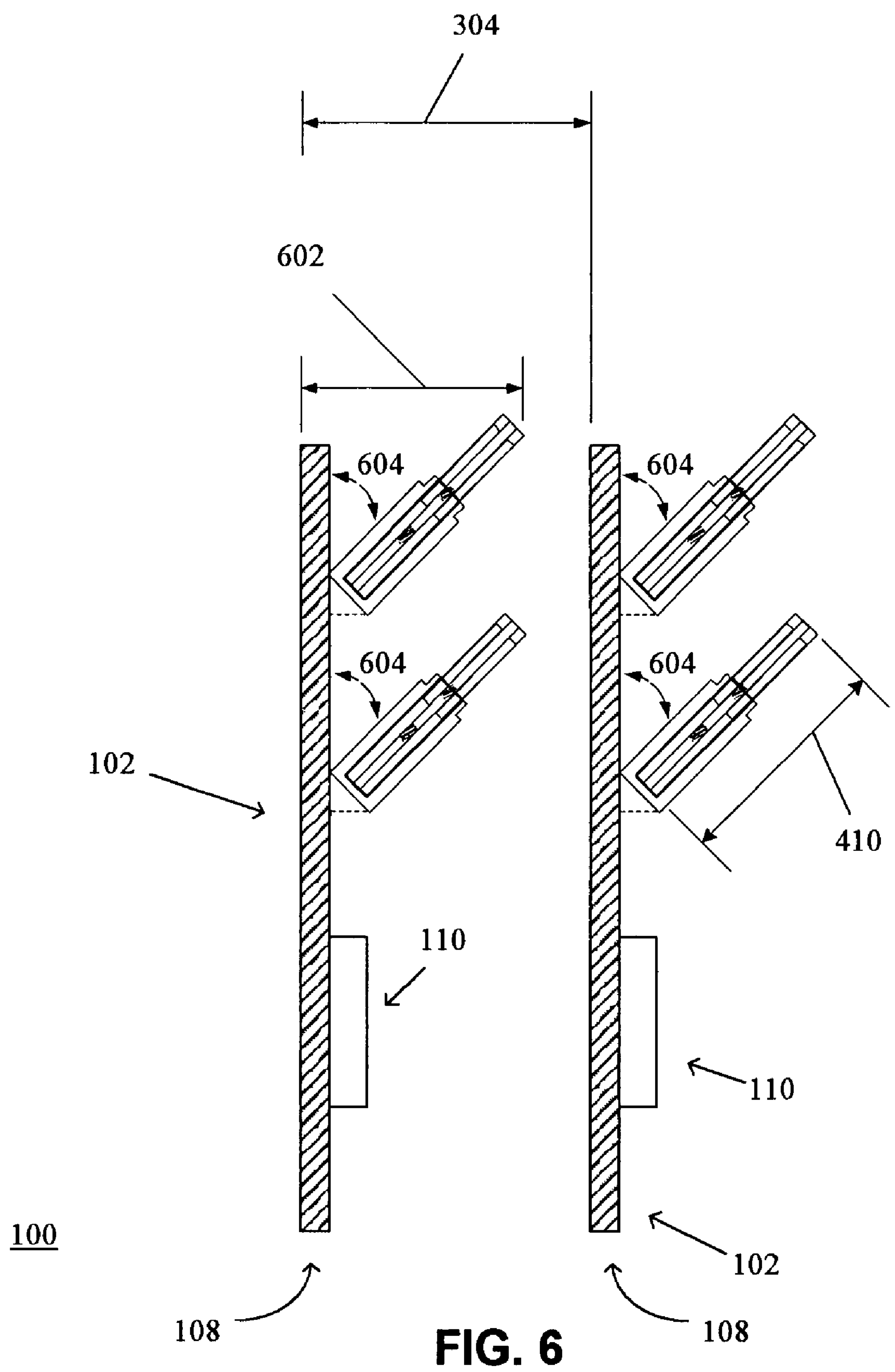
FIG. 6 is a side, partial representation of two riser cards and four parallel protocol memory modules of the implementation of the apparatus of FIG., and illustrates an exemplary translator of the riser cards.

Referring to FIGS. 1 through 4, exemplary interfaces 132, 134, 136, 138 are vertical and/or orthogonal. An exemplary DDR-DIMM interface as the interface 132, 134, 136, 138 in an example comprises connection of two hundred forty (240) pins and/or fingers that comply with standards of the JEDEC Solid State Technology Association (previously known as the Joint Electron Device Engineering Council; World Wide Web jedec.org). Referring to FIGS. 1, 2, 5, and 6, further exemplary interfaces 132, 134, 136, 138 are angled and/or oblique. An exemplary angle 604 comprises twenty (20) to thirty (30) degrees, for example, twenty-five (25) degrees, relative to a supporting face of the riser card 102. Referring to FIG. 6, an exemplary depth 602 of the parallel protocol memory module 112, 114 comprises approximately 0.9 in (22.86 mm).

Figure 8:
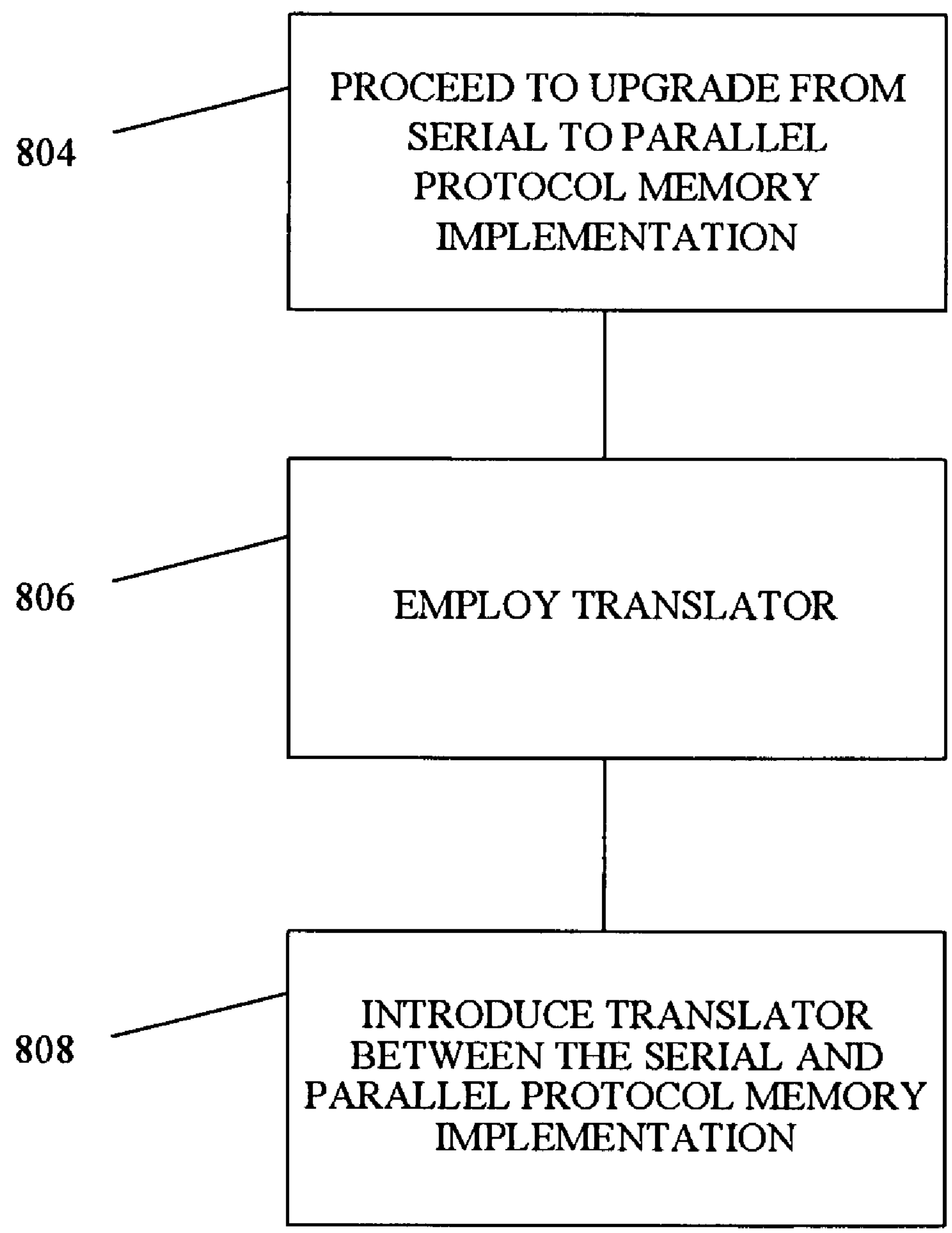
FIG. 8 is a representation of an exemplary logic flow for upgrade of a serial protocol memory implementation to a parallel protocol memory implementation of the apparatus of FIG. 1.

An illustrative description of an exemplary operation of an implementation of the apparatus 100 is presented, for explanatory purposes. FIG. 8 is a representation of an exemplary logic flow 802 for upgrade of a serial protocol memory implementation 106, 126 to a parallel protocol memory implementation 112, 114, 116, 118. The logic flow 802 in an example is performed by a user, a consumer, an on-site service technician and/or provider, and/or an in-shop service technician and/or provider. STEP 804 in an example proceeds to perform an upgrade a serial protocol memory implementation 106, 126 within a printed circuit board (PCB) 104 to a parallel protocol memory implementation 112, 114, 116, 118 outside the PCB 104. STEP 806 employs a translator 110. STEP 808 introduces the translator 110 between the serial protocol memory implementation 106, 126 and the parallel protocol memory implementation 112, 114, 116, 118 through a serial connection external interface 124 of the PCB 104.

An exemplary implementation comprises a translator 110 that through a serial connection external interface 124 of a printed circuit board (PCB) 104 communicates between a serial memory protocol within the PCB 104 and a parallel memory protocol outside the PCB 104.

The serial memory protocol comprises a fully buffered dual in-line memory module (FB-DIMM) protocol within the PCB 104. The parallel memory protocol comprises a double data rate synchronous dynamic random access memory (DDR SDRAM) protocol outside the PCB 104. The translator 110 communicates through the serial connection external interface 124 of the PCB 104 between the FB-DIMM protocol within the PCB 104 and the DDR SDRAM protocol outside the PCB 104.

The DDR SDRAM protocol comprises a DDR3 SDRAM protocol. The translator 110 communicates through the serial connection external interface 124 of the PCB 104 between the FB-DIMM protocol within the PCB 104 and the DDR3 SDRAM protocol outside the PCB 104.

A riser card 102 comprises the translator 110. The riser card 102 plugs into the serial connection external interface 124 of the PCB 104 to communicatively interconnect the serial memory protocol within the PCB 104 and the parallel memory protocol outside the PCB 104. The riser card 102 allows supplementation to the PCB 104 through the serial connection external interface 124 of the PCB 104 of one or more parallel memory protocol cards 112, 114 that are plugged into the riser card 102. The translator 110 communicates through the serial connection external interface 124 of the PCB 104 between the serial memory protocol within the PCB 104 and the one or more parallel memory protocol cards 112, 114 that are plugged into the riser card 102. The serial connection external interface 124 comprises an FB-DIMM connector 124 of a plural number of FB-DIMM connectors 124 on the PCB 104. The riser card 102 comprises a plurality of DDR-DIMM connectors 132, 134 that is equal in number to the plural number of FB-DIMM connectors 124 on the PCB 104.

The serial memory protocol comprises FB-DIMM protocol within the PCB 104. The translator 110 communicates through the serial connection external interface 124 of the PCB 104 between the FB-DIMM protocol within the PCB 104 and the parallel memory protocol outside the PCB 104. The parallel memory protocol comprises a double data rate (DDR) memory protocol outside the PCB 104. The translator 110 communicates through the serial connection external interface 124 of the PCB 104 between the serial memory protocol within the PCB 104 and the DDR memory protocol outside the PCB 104. The DDR memory protocol comprises a DDR3 SDRAM protocol. The translator 110 communicates through the serial connection external interface 124 of the PCB 104 between the serial memory protocol within the PCB 104 and the DDR3 SDRAM protocol outside the PCB 104.

A riser card 102 comprises the translator 110. The riser card 102 connects substantially axially with the serial connection external interface 124 of the PCB 104 and at least in part laterally connects with a parallel connection external interface 136 of a first memory module 112 that employs the parallel memory protocol. The riser card 102 supports the first memory module 112 with avoidance of abutment of the first memory module 112 with a second memory module 112 supported by an adjacent riser card 102.

An exemplary approach performs an upgrade of a serial protocol memory implementation 106, 126 within a printed circuit board (PCB) 104 to a parallel protocol memory implementation 112, 114, 116, 118 outside the PCB 104 through employment of a translator 110 introduced between the serial protocol memory implementation 106, 126 and the parallel protocol memory implementation 112, 114, 116, 118 through a serial connection external interface 124 of the PCB 104.

The PCB 104 is provided to a user as a field deployment of the PCB 104. The upgrade of the serial protocol memory implementation 106, 126 on the PCB 104 to the parallel protocol memory implementation 112, 114, 116, 118 outside the PCB 104 is performed after the field deployment of the PCB 104 to the user.

The translator 110 is coupled with and/or located on a riser card 102. The riser card 102 is plugged into the serial connection external interface 124 of the PCB 104. The translator 110 serves to allow communication between the serial protocol memory implementation 106, 126 on the PCB 104 and the parallel protocol memory implementation 112, 114, 116, 118 outside the PCB 104.

The serial connection external interface 124 comprises an FB-DIMM connector 124 of a plural number of FB-DIMM connectors 124 on the PCB 104. Into the serial connection external interface 124 of the PCB 104 is plugged a riser card 102 that comprises a plurality of DDR-DIMM connectors 132, 134 that is equal in number to the plural number of FB-DIMM connectors 124 on the PCB 104. The translator 110 is coupled with and/or located on a riser card 102. The translator 110 serves to allow communication between the serial protocol memory implementation 106, 126 on the PCB 104 and the parallel protocol memory implementation 112, 114, 116, 118 outside the PCB 104.

The upgrade of the serial protocol memory implementation 106, 126 on the PCB 104 to the parallel protocol memory implementation 112, 114, 116, 118 outside the PCB 104 is performed before a field deployment of the PCB 104 to a user.

An exemplary approach allows selection of any one of a serial protocol memory implementation 106, 128 or a parallel protocol memory implementation 112, 114, 116, 118 through external connection with a serial connection external interface 124 of a printed circuit board (PCB) 104 of a corresponding any one of: a serial memory protocol; or a parallel memory protocol.

A user is allowed to employ the parallel protocol memory implementation 112, 114, 116, 118 by plugging into the serial connection external interface 124 of the PCB 104 a riser card 102 that is coupled with the parallel memory protocol. The serial memory protocol is employed within the PCB 104. The parallel memory protocol is implemented outside the PCB 104. There is translating through the serial connection external interface 124 of the PCB 104 between the serial memory protocol within the PCB 104 and the parallel memory protocol outside the PCB 104 upon a selection of the parallel protocol memory implementation 112, 114, 116, 118.

The serial connection external interface 124 comprises an FB-DIMM connector 124 of a plural number of FB-DIMM connectors 124 on the PCB 104. The serial memory protocol is employed within the PCB 104. The parallel memory protocol is implemented outside the PCB 104. A user is allowed to plug into the serial connection external interface 124 of the PCB 104 a riser card 102 that comprises a plurality of DDR-DIMM connectors 132, 134 that is equal in number to the plural number of FB-DIMM connectors 124 on the PCB 104. A user is allowed to employ the serial protocol memory implementation 106, 128 by plugging into the serial connection external interface 124 of the PCB 104 a serial protocol memory module 128 that employs the serial memory protocol.

An implementation of the apparatus 100 in an example comprises a plurality of components such as one or more of electronic components, chemical components, organic components, mechanical components, hardware components, optical components, and/or computer software components. A number of such components can be combined or divided in an implementation of the apparatus 100. In one or more exemplary implementations, one or more features described herein in connection with one or more components and/or one or more parts thereof are applicable and/or extendible analogously to one or more other instances of the particular component and/or other components in the apparatus 100. In one or more exemplary implementations, one or more features described herein in connection with one or more components and/or one or more parts thereof may be omitted from or modified in one or more other instances of the particular component and/or other components in the apparatus 100. An exemplary technical effect is one or more exemplary and/or desirable functions, approaches, and/or procedures. An exemplary component of an implementation of the apparatus 100 employs and/or comprises a set and/or series of computer instructions written in or implemented with any of a number of programming languages, as will be appreciated by those skilled in the art. An implementation of the apparatus 100 in an example comprises any (e.g., horizontal, oblique, or vertical) orientation, with the description and figures herein illustrating an exemplary orientation of an exemplary implementation of the apparatus 100, for explanatory purposes.

An implementation of the apparatus 100 in an example encompasses an article. The article comprises one or more computer-readable signal-bearing media. The article comprises means in the one or more media for one or more exemplary and/or desirable functions, approaches, and/or procedures.

An implementation of the apparatus 100 in an example employs one or more computer readable signal bearing media. A computer-readable signal-bearing medium in an example stores software, firmware and/or assembly language for performing one or more portions of one or more implementations. An example of a computer-readable signal bearing medium for an implementation of the apparatus 100 comprises a memory and/or recordable data storage medium of the riser card 102 and/or PCB 104. A computer-readable signal-bearing medium for an implementation of the apparatus 100 in an example comprises one or more of a magnetic, electrical, optical, biological, chemical, and/or atomic data storage medium. For example, an implementation of the computer-readable signal-bearing medium comprises one or more floppy disks, magnetic tapes, CDs, DVDs, hard disk drives, and/or electronic memory. In another example, an implementation of the computer-readable signal-bearing medium comprises a modulated carrier signal transmitted over a network comprising or coupled with an implementation of the apparatus 100, for instance, one or more of a telephone network, a local area network ("LAN"), a wide area network ("WAN"), the Internet, and/or a wireless network.

The steps or operations described herein are examples. There may be variations to these steps or operations without departing from the spirit of the invention. For example, the steps may be performed in a differing order, or steps may be added, deleted, or modified.

Although exemplary implementation of the invention has been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:

a translator that communicates between a serial memory protocol within a printed circuit board (PCB) and a parallel memory protocol outside the PCB, said translator's communication between said serial memory protocol and said parallel memory protocol is performed through a serial connection external interface of said PCB; and a riser card comprising said translator, wherein said riser card removeably plugs into said serial connection external interface to communicatively interconnect, via said translator, said serial memory protocol and said parallel memory protocol of at least one parallel memory protocol card which is removeably plugged into said riser card;

wherein the parallel memory protocol comprises a double data rate synchronous dynamic random access memory (DDR SDRAM) protocol outside the PCB, wherein said translator communicates through the serial connection external interface of the PCB between the serial memory protocol within the PCB and the DDR SDRAM protocol outside the PCB.

2. The apparatus of claim 1, wherein the serial memory protocol comprises a fully buffered dual in-line memory module (FB-DIMM) protocol within the PCB, wherein said translator communicates through the serial connection external interface of the PCB between the FB-DIMM protocol within the PCB and the DDR SDRAM protocol outside the PCB.

3. The apparatus of claim 2, wherein the DDR SDRAM protocol comprises a DDR3 SDRAM protocol, wherein said translator communicates through the serial connection external interface of the PCB between the FB-DIMM protocol within the PCB and the DDR3 SDRAM protocol outside the PCB.

4. The apparatus of claim 1, wherein the serial connection external interface comprises an FB-DIMM connector of a plural number of FB-DIMM connectors on the PCB; and wherein said riser card comprises a plurality of DDR-DIMM connectors that is equal in number to the plural number of FB-DIMM connectors on the PCB.

5. The apparatus of claim 1, wherein the serial memory protocol comprises FB-DIMM protocol within the PCB, wherein said translator communicates through the serial connection external interface of the PCB between the FB-DIMM protocol within the PCB and the parallel memory protocol outside the PCB.

6. The apparatus of claim 1, wherein the DDR SDRAM memory protocol comprises a DDR3 SDRAM protocol, wherein said translator communicates through the serial connection external interface of the PCB between the serial memory protocol within the PCB and the DDR3 SDRAM protocol outside the PCB.

7. The apparatus of claim 1, wherein said riser card connects substantially axially with the serial connection external interface of the PCB and at least in part laterally connects with a parallel connection external interface of said at least one parallel memory protocol card, wherein said riser card supports said at least one parallel memory protocol card with avoidance of abutment with a second adjacent riser card.

8. A process, comprising the step of:

performing an upgrade of a serial protocol memory implementation within a printed circuit board (PCB) to a parallel protocol memory implementation outside the PCB through employment of a riser card which is removeably plugged into a serial connection external interface of said PCB and comprising a translator which communicates through said serial connection external interface between said serial protocol memory implementation and said parallel memory protocol of at least one parallel memory protocol card which is removeably plugged into said riser card;

wherein the parallel memory protocol comprises a double data rate synchronous dynamic random access memory (DDR SDRAM) protocol outside the PCB, wherein said translator communicates through the serial connection external interface of the PCB between the serial memory protocol within the PCB and the DDR SDRAM protocol outside the PCB.

9. The process of claim 8, wherein the step of performing the upgrade comprises the steps of:

performing the upgrade of the serial protocol memory implementation on the PCB to the parallel protocol memory implementation outside the PCB after the field deployment of the PCB.

10. The process of claim 8, wherein the serial connection external interface comprises an FB-DIMM connector of a plural number of FB-DIMM connectors on the PCB, wherein the step of performing the upgrade comprises the step of:

plugging into the serial connection external interface of the PCB said riser card that comprises a plurality of DDR-DIMM connectors that is equal in number to the plural number of FB-DIMM connectors on the PCB.

11. The process of claim 8, wherein the step of performing the upgrade comprises the step of:

performing the upgrade of the serial protocol memory implementation on the PCB to the parallel protocol memory implementation outside the PCB before a field deployment of the PCB.

12. A process, comprising the step of:

allowing selection of a serial protocol memory implementation within a printed circuit board (PCB) and a parallel protocol memory implementation through external connection with a serial connection external interface of said PCB of a corresponding:

serial memory protocol; and a parallel memory protocol wherein said parallel memory protocol is implemented using a riser card, which is removeably plugged into a serial connection external interface of said PCB, and comprising a translator which communicates through said serial connection external interface between the serial memory protocol implementation and the parallel memory protocol of at least one parallel memory protocol card which is removeably plugged into said riser card;

wherein the parallel memory protocol comprises a double data rate synchronous dynamic random access memory (DDR SDRAM) protocol outside the PCB, wherein said translator communicates through the serial connection external interface of the PCB between the serial memory protocol within the PCB and the DDR SDRAM protocol outside the PCB.

13. The process of claim 12, wherein the serial connection external interface comprises an FB-DIMM connector of a plural number of FB-DIMM connectors on the PCB, wherein the serial memory protocol is employed within the PCB, wherein the parallel memory protocol is implemented outside the PCB, wherein the step of allowing selection of the any one of the serial protocol memory implementation or the parallel protocol memory implementation comprises the step of:

plugging into the serial connection external interface of the PCB said riser card comprising a plurality of DDR-DIMM connectors that is equal in number to the plural number of FB-DIMM connectors on the PCB.

14. The process of claim 12, wherein the step of allowing selection of the any one of the serial protocol memory implementation or the parallel protocol memory implementation comprises the step of:

permitting the employment of the serial protocol memory implementation by plugging into the serial connection external interface of the PCB a serial protocol memory module that employs the serial memory protocol.

* * * * *